US012417772B2

(12) United States Patent
Chen et al.

(10) Patent No.: US 12,417,772 B2
(45) Date of Patent: *Sep. 16, 2025

(54) ROBUST SPOOFING DETECTION SYSTEM USING DEEP RESIDUAL NEURAL NETWORKS

(71) Applicant: PINDROP SECURITY, INC., Atlanta, GA (US)

(72) Inventors: Tianxiang Chen, Atlanta, GA (US); Elie Khoury, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/394,300

(22) Filed: Dec. 22, 2023

(65) Prior Publication Data
US 2024/0153510 A1 May 9, 2024

Related U.S. Application Data

(63) Continuation of application No. 17/155,851, filed on Jan. 22, 2021, now Pat. No. 11,862,177.
(Continued)

(51) Int. Cl.
*G10L 17/18* (2013.01)
*G10L 17/02* (2013.01)
(Continued)

(52) U.S. Cl.
CPC .............. *G10L 17/18* (2013.01); *G10L 17/02* (2013.01); *G10L 17/04* (2013.01); *G10L 17/08* (2013.01); *G10L 17/22* (2013.01)

(58) Field of Classification Search
CPC ......... G10L 17/18; G10L 17/02; G10L 17/04; G10L 17/08; G10L 17/22
(Continued)

(56) References Cited

U.S. PATENT DOCUMENTS

| 5,442,696 A * | 8/1995 | Lindberg ............... H04L 27/30 340/7.49 |
| 5,570,412 A * | 10/1996 | LeBlanc ............... H04W 64/00 455/456.2 |

(Continued)

FOREIGN PATENT DOCUMENTS

| JP | H05-143094 A | 6/1993 |
| JP | 2018-508799 A | 3/2018 |

(Continued)

OTHER PUBLICATIONS

Alzantot et al., "Deep Residual Neural Networks for Audio Spoofing Detection", Department of Computer Science, UCLA, INTERSPEECH 2019, Sep. 15-19, 2019, Graz, Austria, pp. 1078-1082 (5 pages).
(Continued)

*Primary Examiner* — Edwin S Leland, III
(74) *Attorney, Agent, or Firm* — Foley & Lardner LLP

(57) ABSTRACT

Embodiments described herein provide for systems and methods for implementing a neural network architecture for spoof detection in audio signals. The neural network architecture contains a layers defining embedding extractors that extract embeddings from input audio signals. Spoofprint embeddings are generated for particular system enrollees to detect attempts to spoof the enrollee's voice. Optionally, voiceprint embeddings are generated for the system enrollees to recognize the enrollee's voice. The voiceprints are extracted using features related to the enrollee's voice. The spoofprints are extracted using features related to features of how the enrollee speaks and other artifacts. The spoofprints facilitate detection of efforts to fool voice biometrics using synthesized speech (e.g., deepfakes) that spoof and emulate the enrollee's voice.

20 Claims, 7 Drawing Sheets

Related U.S. Application Data

(60) Provisional application No. 63/068,670, filed on Aug. 21, 2020, provisional application No. 62/966,473, filed on Jan. 27, 2020.

(51) Int. Cl.
  *G10L 17/04* (2013.01)
  *G10L 17/08* (2013.01)
  *G10L 17/22* (2013.01)

(58) Field of Classification Search
  USPC .......................................................... 704/232
  See application file for complete search history.

(56) References Cited

U.S. PATENT DOCUMENTS

| | | | | |
|---|---|---|---|---|
| 5,724,404 | A * | 3/1998 | Garcia | H04M 3/36 379/32.02 |
| 5,825,871 | A * | 10/1998 | Mark | H04M 17/02 379/357.03 |
| 6,041,116 | A * | 3/2000 | Meyers | H04M 3/5158 379/244 |
| 6,134,448 | A * | 10/2000 | Shoji | G01S 5/0054 342/450 |
| 6,654,459 | B1 * | 11/2003 | Bala | H04L 63/18 713/168 |
| 6,735,457 | B1 * | 5/2004 | Link, II | H04M 1/505 455/418 |
| 6,765,531 | B2 * | 7/2004 | Anderson | G01S 5/021 342/378 |
| 7,787,598 | B2 * | 8/2010 | Agapi | H04M 3/493 379/27.04 |
| 8,050,393 | B2 * | 11/2011 | Apple | H04M 3/38 379/142.05 |
| 8,223,755 | B2 * | 7/2012 | Jennings | H04L 65/1069 370/353 |
| 8,311,218 | B2 * | 11/2012 | Mehmood | H04L 9/3273 713/168 |
| 8,385,888 | B2 * | 2/2013 | Labrador | H04M 3/382 379/283 |
| 9,060,057 | B1 * | 6/2015 | Danis | H04L 63/083 |
| 9,078,143 | B2 * | 7/2015 | Rodriguez | H04W 24/08 |
| 9,704,478 | B1 * | 7/2017 | Vitaladevuni | G10L 15/00 |
| 10,257,591 | B2 * | 4/2019 | Gaubitch | H04Q 3/70 |
| 11,862,177 | B2 * | 1/2024 | Chen | G10L 17/08 |
| 2002/0181448 | A1 * | 12/2002 | Uskela | H04L 63/1466 370/352 |
| 2003/0012358 | A1 * | 1/2003 | Kurtz | H04M 3/005 379/406.13 |
| 2011/0051905 | A1 * | 3/2011 | Maria Poels | H04M 3/22 379/32.01 |
| 2011/0123008 | A1 * | 5/2011 | Sarnowski | H04L 63/18 379/93.02 |
| 2015/0120027 | A1 * | 4/2015 | Cote | G08G 5/21 700/94 |
| 2016/0293185 | A1 * | 10/2016 | Cote | G10L 19/018 |
| 2017/0222960 | A1 * | 8/2017 | Agarwal | G06Q 10/107 |
| 2017/0302794 | A1 * | 10/2017 | Spievak | H04M 3/2281 |
| 2017/0359362 | A1 * | 12/2017 | Kashi | H04L 51/212 |
| 2018/0197547 | A1 * | 7/2018 | Shi | G10L 25/30 |
| 2018/0254046 | A1 * | 9/2018 | Khoury | G10L 17/04 |
| 2019/0228778 | A1 * | 7/2019 | Lesso | G10L 17/04 |
| 2019/0228779 | A1 * | 7/2019 | Lesso | G10L 15/08 |
| 2019/0354808 | A1 | 11/2019 | Park et al. | |
| 2020/0322377 | A1 * | 10/2020 | Lakhdhar | G06N 3/045 |
| 2021/0110813 | A1 * | 4/2021 | Khoury | G10L 15/063 |
| 2021/0233541 | A1 * | 7/2021 | Chen | G10L 17/02 |
| 2022/0121868 | A1 * | 4/2022 | Chen | G06V 40/70 |

FOREIGN PATENT DOCUMENTS

| | | |
|---|---|---|
| WO | WO-2019/145708 A1 | 8/2019 |
| WO | WO-2020/003533 A1 | 1/2020 |

OTHER PUBLICATIONS

Alzantot, M. et al., "Deep Residual Neural Networks for Audio Spoofing Detection", INTERSPEECH 2019, Graz, Austria, pp. 1078-1082, https://www.researchgate.net/profile/Ziqi-Wang-16/publication/334161923_Deep_Residual_Neural_Networks_for_Audio_Spoofing_Detection/links/5df73aee299bf10bc35f10b9/Deep-Residual-Neural-Networks-for-Audio-Spoofing-Detection.pdf, Sep. 15-19, 2019.
Canadian Examination Report dated Oct. 16, 2019, issued in corresponding Canadian Application No. 3,032,807, 3 pages.
Examination Report No. 1 for Australian app. 2021212621 dated Mar. 1, 2023 (4 pages).
Final Office Action on U.S. Appl. No. 17/155,851 dated May 25, 2023.
First Examiner's Requisition for CA App. 3,168,248 dated Aug. 21, 2023 (4 pages).
International Preliminary Report on Patentability for PCT Appl. Ser. No. PCT/US2021/014633, Aug. 11, 2022 (9 pages).
International Search Report and Written Opinion for PCT Appl. Ser. No. PCT/US2021/014633 dated Apr. 7, 2021 (11 pages).
International Search Report issued in International Application No. PCT/US2017/044849 dated Jan. 11, 2018 (8 pages).
Non-Final Office Action on U.S. Appl. No. 17/155,851 dated Feb. 9, 2023 (21 pages).
Notice of Allowance on U.S. Appl. No. 17/155,851 dated Aug. 25, 2023.
Notice of Allowance on U.S. Appl. No. 17/155,851 dated Sep. 27, 2023 (8 pages).
Schulzrinne et al., "RTP Payload for DTMF Digits, Telephone Tones, and Telephony Signals" Columbia University, Dec. 2006, (50 Pages)<https://tools.ielf.org/html/rfc4733.>.
Snyder et al., "X-Vectors: Robust DNN Embeddings for Speaker Recognition," Center for Language and Speech Processing & Human Language Technology Center of Excellence, The Johns Hopkins University, 2018.
US Final Office Action on U.S. Appl. No. 15/155,851 dated Nov. 8, 2022 (21 pages).
US Non Final Office Action on U.S. Appl. No. 17/155,851 dated May 10, 2022 (18 pages).
Cai Weicheng et al: "The DKU Replay Detection System for the ASVspoof 2019 Challenge: On Data Augmentation, Feature Representation, Classification, and Fusion", INTERSPEECH 2019, Jul. 5, 2019 (Jul. 5, 2019), pp. 1023-1027, XP093117136, ISCA DOI: 10.21437/Interspeech.2019-1230 Retrieved from the Internet: URL:https://arxiv.org/pdf/1907.02663.pdf [retrieved on Jan. 9, 2024] * Abstract, Sections 2.3 and 3.6 *.
Extended European Search Report on EPO App. 21747446.9 dated Jan. 23, 2024 (9 pages).
Li Jiakang et al: "Joint Decision of Anti-Spoofing and Automatic Speaker Verification by Multi-Task Learning With Contrastive Loss", IEEE Access, IEEE, USA, vol. 8, Jan. 6, 2020 (Jan. 6, 2020), pp. 7907-7915, XP011765568, DOI: 10.1109/ACCESS.2020.2964048 [retrieved on Jan. 14, 2020] * Abstract and Section II*.
Li Jiakang et al: "Multi-task learning of deep neural networks for joint automatic speaker verification and spoofing detection", 2019 Asia-Pacific Signal and Information Processing Association Annual Summit and Conference (APSIPA ASC), IEEE, Nov. 18, 2019 (Nov. 18, 2019), pp. 1517-1522, XP033733199, DOI: 10.1109/APSIPAASC47483.2019.9023289 [retrieved on Mar. 2, 2020] * Abstract, Sections III-A and III-B *.
EPO Examination Report for European Application No. 21747446.9 mailing date Jan. 17, 2025, 4 pages.
JP Office Action for Application No. 2022543650 mailing date Mar. 25, 2025, 12 pages.

* cited by examiner

ROBUST SPOOFING DETECTION SYSTEM USING DEEP RESIDUAL NEURAL NETWORKS

CROSS-REFERENCE TO RELATED APPLICATIONS

This application is a continuation application of U.S. application Ser. No. 17/155,851, filed Jan. 22, 2021, which claims priority to U.S. Provisional Application No. 62/966,473, filed Jan. 27, 2020, and also claims priority to U.S. Provisional Application No. 63/068,670, filed Aug. 21, 2020, each of which is incorporated by reference in its entirety.

This application is generally related to U.S. application Ser. No. 17/066,210, filed Oct. 8, 2020, which claims priority to U.S. Provisional Application No. 62/914,182, filed Oct. 11, 2019, each of which is incorporated by reference in its entirety.

This application is generally related U.S. application Ser. No. 17/079,082, filed Oct. 23, 2020, which claims priority to U.S. Provisional Application No. 62/925,349, filed Oct. 24, 2019, each of which is incorporated by reference in its entirety.

TECHNICAL FIELD

This application generally relates to systems and methods for managing, training, and deploying neural network architecture for audio processing. In particular, this application relates to neural network architectures for spoof detection and speaker recognition in audio signals.

BACKGROUND

Voice biometrics for speaker recognition and other operations (e.g., authentication) may identify and extract embeddings representing the low-level features of particular speakers. These embeddings can be referenced later during testing time to determine a later speaker's voice matches the stored embedding. Soon however, conventional approaches for voice matching will insufficient or obsolete due to improvements in speech synthesis tools capable of fooling these conventional systems.

Audio deepfakes, technically known as logical-access voice spoofing attacks, have become an increased threat on voice interfaces due to the recent breakthroughs in speech synthesis and voice conversion technologies. Effectively detecting these attacks is critical to many speech applications, including intelligent speaker verification systems. As new types of speech synthesis and voice conversion techniques are emerging quickly, spoofing countermeasures are becoming a very important challenge. Synthesized speech tools could generate synthesized speech that satisfies (and fools) the requirements of conventional voice biometrics test.

What is therefore needed are systems and methods for spoof detection, even in instances of synthesized speech tools closely mimic the voice features of known speakers. Given the rapid development of unforeseen and unknown speech synthesis tools, it is further desired that spoof detection techniques are capable of detecting spoof attempts even when the particular logical-access attack technique employed was previously unknown.

SUMMARY

Disclosed herein are systems and methods capable of addressing the above described shortcomings and may also provide any number of additional or alternative benefits and advantages. Embodiments described herein provide for systems and methods for implementing a neural network architecture for spoof detection in audio signals. The neural network architecture contains one or more layers defining embedding extractors that extract embeddings from input audio signals, including voiceprint embeddings and spoofprint embeddings. The neural network architecture uses the voiceprint to evaluate the likelihood that a speaker's voice features match an enrollee's voice. The neural network architecture uses the spoofprint to evaluate the likelihood that the inbound speaker's voice is a spoofed or genuine instance of the enrollee's voice. The neural network architecture extracts a set of features from audio signals for spoofprints that are (at least in part) different from the set of features extracted for voiceprints. The feature vectors generated when extracting the voiceprint are based on a set of features reflecting the speaker's voice. The feature vectors generated when extracting the spoofprint are based on a set of features including various audio spoof characteristics indicating spoofing artifacts, such as specific aspects of how the speaker speaks, such as speech patterns that are difficult for the speech synthesizer tools to emulate. Additionally or alternatively, embodiments described herein may employ a large margin cosine loss function (LMCL), as adapted from the conventional use in facial recognition systems. Beneficially, the LMCL maximizes the variance between genuine and spoofed class and at the same time, minimize intra-class variance.

In an embodiment, a computer-implemented method for spoofing countermeasures in which the method comprises: generating, by a computer, an enrollee spoofprint for an enrollee based upon a first set of one or more features extracted from one or more enrollee audio signals for the enrollee, wherein the first set of one or more features includes one or more audio characteristics of the enrollee; applying, by the computer, a neural network architecture to an inbound audio signal, the neural network architecture trained to detect spoofing artifacts occurring in an audio signal; generating, by the computer, an inbound spoofprint for an inbound speaker by applying the neural network architecture to the inbound audio signal for the inbound speaker; and generating, by the computer, a spoof likelihood score for the inbound audio signal based upon one or more similarities between the inbound spoofprint and the enrollee spoofprint.

In another embodiment, a computer-implemented method for spoofing countermeasures in which the method comprises: obtaining, by a computer, a plurality of training audio signals including one or more clean audio signals and one or more simulated audio signals; training, by the computer, a neural network architecture to extract a spoofprint embedding from an audio signal and classify the audio signal, the neural network architecture trained by applying the neural network architecture on a plurality of features of the plurality of training audio signals; extracting, by the computer, an inbound spoofprint for the inbound speaker by applying the neural network architecture on the plurality of features of an inbound audio signal; and generating, by the computer, a classification for the inbound audio signal based upon applying the neural network architecture on the inbound spoofprint.

In another embodiment, a system comprises a non-transitory machine readable memory and a computer comprising a processor. The computer is configured to generate an enrollee spoofprint for an enrollee based upon a first set of one or more features extracted from one or more enrollee audio signals for the enrollee, wherein the first set of one or more features includes audio characteristics of the enrollee; store the enrollee spoofprint into the memory; apply a neural network architecture to an inbound audio signal, the neural network architecture trained to detect spoofing artifacts occurring in an audio signal; generate an inbound spoofprint for an inbound speaker by applying the neural network architecture to an inbound audio signal for the inbound speaker; and generate a spoof likelihood score for the inbound audio signal based upon one or more similarities between the inbound spoofprint and the enrollee spoofprint.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
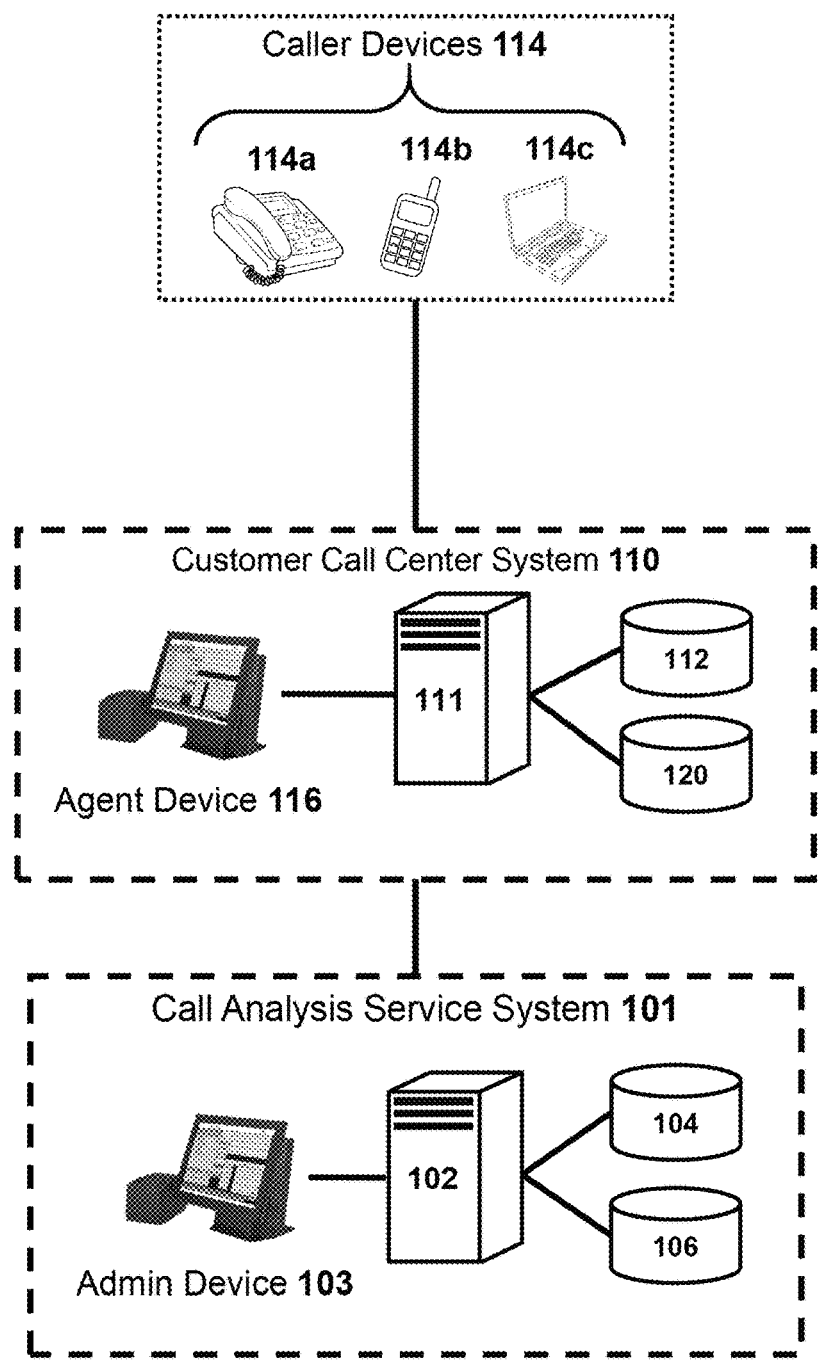
FIG. 1 shows components of a system for receiving and analyzing telephone calls, according to an illustrative embodiment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

Voice biometrics for speaker recognition and other operations (e.g., authentication) typically rely upon models or vectors generated from a universe of speaker samples and samples of a particular speaker. As an example, during a training phase (or re-training phase), a server or other computing device executes a speech recognition engine (e.g., artificial intelligence and/or machine-learning programmatic software) that is trained to recognize and distinguish instances of speech using a plurality of training audio signals. The neural network architecture outputs certain results according to corresponding inputs and evaluates the results according to a loss function by comparing the expected output against the observed output. The training operations then tailor the weighted values of the neural network architecture (sometimes called hyper-parameters) and reapply the neural network architecture to the inputs until the expected outputs and observed outputs converge. The server then fixes the hyper-parameters and, in some cases, disables one or more layers of the neural network architecture used for training.

The server can further train the speaker recognition engine to recognize a particular speaker during an enrollment phase for the particular enrollee-speaker. The speech recognition engine can generate an enrollee voice feature vector (sometimes called a "voiceprint") using enrollee audio signals having speech segments involving the enrollee. During later inbound phone calls, the server refers to the voiceprints in order to confirm whether later audio signals involve the enrollee based upon matching a feature vector extracted from the later inbound call against the enrollee's voiceprint. These approaches are generally successful and adequate for detecting the enrollee in the inbound call.

A concern, however, is that powerful voice biometric spoofing tools (e.g., deepfake technologies) might eventually use enrollee voice samples to generate a flexible deepfake voice synthesizer tailored to the enrollee, where the enrollee synthesizer would be capable of fooling the recognition engine by conveying features closely matching enrollee's voiceprint. A problem with current spoofing detection system is generalization ability. Traditionally, signal processing researchers tried to overcome this problem by introducing different ways to of processing the input audio files. Prior approaches for detecting synthetic speech spoofing employed, for example, high-frequency cepstrum coefficients (HFCC), constant-Q cepstral coefficients (CQCC)), a cosine normalized phase, and a modified-group delay (MGD) operation. Although, these such approaches confirmed the effectiveness of various audio processing techniques in detecting synthetic speech, these approaches were unable to address the problem of the generalization ability. This shortcoming prevents prior approaches from, for example, generalizing adequately on unknown spoofing technologies and thus insufficiently detecting spoofing for unknown spoof techniques.

As described herein, the system could generate another enrollee feature vector for detecting spoofed instances of the enrollee's voice (sometimes called a "spoofprint"). The spoofprint test evaluates the likelihood that the inbound speaker's voice is a spoofed or genuine instance of the enrollee's voice. A speech synthesizer could satisfy a voiceprint test by conveying synthetic speech with voice-related features that are sufficiently similar to the voice-related features of an enrollee to satisfy the similarity requirements of the voiceprint test. The speech synthesizer, however, would fail the spoofprint test, because the synthetic speech would not contain the speaking behavior and/or spoofing artifacts sufficiently similar to the corresponding features expected from the enrollee. The embodiments described herein extract a set of features from audio signals for spoofprints that are (at least in part) different from the set of features extracted for voiceprints. The low-level features extracted from an audio signal may include mel frequency cepstral coefficients (MFCCs), HFCCs, CQCCs, and other features related to the speaker voice characteristics, and spoofing artifacts of the speaker (e.g., speaker speech characteristics) and/or a device or network (e.g., speaker patterns, DTMF tones, background noise, codecs, packet loss). The feature vectors generated when extracting the voiceprint are based on a set of features reflecting the speaker's voice characteristics, such as the spectro-temporal features (e.g., MFCCs, HFCCs, CQCCs). The feature vectors generated when extracting the spoofprint are based on a set of features including audio characteristics of the call, such as spoofing artifacts (e.g., specific aspects of how the speaker speaks), which may include the frequency that a speaker uses certain phonemes (patterns) and the speaker's natural rhythm of speech. The spoofing artifacts are often difficult for synthetic speech programs to emulate.

The neural network architecture can extract embeddings that are better tailored for spoof detection than merely evaluating the embeddings extracted for voiceprint recognition. Additionally or alternatively, embodiments described herein may employ a loss function during training and/or enrollment, large margin cosine loss function (LMCL), as adapted from the conventional use in facial recognition systems. Beneficially, the LMCL maximizes the variance between genuine and spoofed class and at the same time, minimize intra-class variance. Prior approaches failed to appreciate and employ the use of LMCL in spoof detection in audio signals because, as mentioned, such approaches focused on other areas.

The embodiments described herein implement one or more neural network architectures comprising any number of layers configured to perform certain operations, such as audio data ingestion, pre-processing operations, data augmentation operations, embedding extraction, loss function operations, and classification operations, among others. To perform the various operations, the neural network architectures comprise any number of layers, such as input layers, layers of an embedding extractor, fully-connected layers, loss layers, and layers of a classifier, among others. It should be appreciated that the layers or operations may be performed by any number of neural network architectures. Additionally or alternatively, the layers performing different operations can define different types of neural network architecture. For example, a ResNet neural network architecture could comprise layers and operations defining an embedding extractor, and another neural network architecture could comprise layers and operation defining a classifier. Moreover, certain operations, such as pre-processing operations and data augmentation operations or may be performed by a computing device separately from the neural network architecture or as layers of the neural network architecture. Non-limiting examples of in-network augmentation and pre-preprocessing may be found in U.S. application Ser. Nos. 17/066,210 and 17/079,082, which are incorporated by reference herein.

Following classification of an inbound audio signal (e.g., genuine or spoofed), the server the employs or transmits the outputted determination to one or more downstream operations. The outputs used by the downstream operation could include the classification determination, similarity scores, and/or the extracted spoofprint or voiceprint. Non-limiting examples of downstream operations and/or the potential uses of the neural network architecture described herein include voice spoof detection, speaker identification, speaker authentication, speaker verification, speech recognition, audio event detection, voice activity detection (VAD), speech activity detection (SAD), and speaker diarization, among others.

Example System Components

FIG. 1 shows components of a system 100 for receiving and analyzing telephone calls, according to an illustrative embodiment. The system 100 comprises a call analytics system 101, call center systems 110 of customer enterprises (e.g., companies, government entities, universities), and caller devices 114. The call analytics system 101 includes analytics servers 102, analytics databases 104, and admin devices 103. The call center system 110 includes call center servers 111, call center databases 112, and agent devices 116. Embodiments may comprise additional or alternative components or omit certain components from those of FIG. 1, and still fall within the scope of this disclosure. It may be common, for example, to include multiple call center systems 110 or for the call analytics system 101 to have multiple analytics servers 102. Embodiments may include or otherwise implement any number of devices capable of performing the various features and tasks described herein. For example, the FIG. 1 shows the analytics server 102 as a distinct computing device from the analytics database 104. In some embodiments, the analytics database 104 may be integrated into the analytics server 102.

Various hardware and software components of one or more public or private networks may interconnect the various components of the system 100. Non-limiting examples of such networks may include Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the caller devices 114 may communicate with callees (e.g., call center systems 110) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as carriers, exchanges, and networks, among others.

The caller devices 114 may be any communications or computing device that the caller operates to place the telephone call to the call destination (e.g., the call center system 110). Non-limiting examples of caller devices 114 may include landline phones 114a and mobile phones 114b. That the caller device 114 is not limited to telecommunications-oriented devices (e.g., telephones). As an example, the caller device 114 may include a caller computing device 114c, which includes an electronic device comprising a processor and/or software, such as or personal computer, configured to implement voice-over-IP (VoIP) telecommunications. As another example, the caller computing device 114c may be an electronic IoT device (e.g., voice assistant device, "smart device") comprising a processor and/or software capable of utilizing telecommunications features of a paired or otherwise networked device, such as a mobile phone 114b.

The call analytics system 101 and the call center system 110 represent network infrastructures 101, 110 comprising physically and logically related software and electronic devices managed or operated by various enterprise organizations. The devices of each network system infrastructure 101, 110 are configured to provide the intended services of the particular enterprise organization.

The analytics server 102 of the call analytics system 101 may be any computing device comprising one or more processors and software, and capable of performing the various processes and tasks described herein. The analytics server 102 may host or be in communication with the analytics database 104, and receives and processes call data (e.g., audio recordings, metadata) received from the one or more call center systems 110. Although FIG. 1 shows only single analytics server 102, the analytics server 102 may include any number of computing devices. In some cases, the computing devices of the analytics server 102 may perform all or sub-parts of the processes and benefits of the analytics server 102. The analytics server 102 may comprise computing devices operating in a distributed or cloud computing configuration and/or in a virtual machine configuration. It should also be appreciated that, in some embodiments, functions of the analytics server 102 may be partly or entirely performed by the computing devices of the call center system 110 (e.g., the call center server 111).

The analytics server 102 executes audio-processing software that includes a neural network that performs speaker spoof detection, among other potential operations (e.g., speaker recognition, speaker verification or authentication, speaker diarization). The neural network architecture operates logically in several operational phases, including a training phase, an enrollment phase, and a deployment phase (sometimes referred to as a test phase or testing). The inputted audio signals processed by the analytics server 102 include training audio signals, enrollment audio signals, and inbound audio signals processed during the deployment phase. The analytics server 102 applies the neural network to each of the types of inputted audio signals during the corresponding operational phase.

The analytics server 102 or other computing device of the system 100 (e.g., call center server 111) can perform various pre-processing operations and/or data augmentation operations on the input audio signals. Non-limiting examples of the pre-processing operations include extracting low-level features from an audio signal, parsing and segmenting the audio signal into frames and segments and performing one or more transformation functions, such as Short-time Fourier Transform (SFT) or Fast Fourier Transform (FFT), among other potential pre-processing operations. Non-limiting examples of augmentation operations include audio clipping, noise augmentation, frequency augmentation, duration augmentation, and the like. The analytics server 102 may perform the pre-processing or data augmentation operations before feeding the input audio signals into input layers of the neural network architecture or the analytics server 102 may execute such operations as part of executing the neural network architecture, where the input layers (or other layers) of the neural network architecture perform these operations. For instance, the neural network architecture may comprise in-network data augmentation layers that perform data augmentation operations on the input audio signals fed into the neural network architecture.

During training, the analytics server 102 receives training audio signals of various lengths and characteristics from one or more corpora, which may be stored in an analytics database 104 or other storage medium. The training audio signals include clean audio signals (sometimes referred to as samples) and simulated audio signals, each of which the analytics server 102 uses to train the neural network to recognize speech occurrences. The clean audio signals are audio samples containing speech in which the speech is identifiable by the analytics server 102. Certain data augmentation operations executed by the analytics server 102 retrieve or generate the simulated audio signals for data augmentation purposes during training or enrollment. The data augmentation operations may generate additional versions or segments of a given training signal containing manipulated features mimicking a particular type of signal degradation or distortion. The analytics server 102 stores the training audio signals into the non-transitory medium of the analytics server 102 and/or the analytics database 104 for future reference or operations of the neural network architecture.

During the training phase and, in some implementations, the enrollment phase, fully connected layers of the neural network architecture generate a training feature vector for each of the many training audio signals and a loss function (e.g., LMCL) determines levels of error for the plurality of training feature vectors. A classification layer of the neural network architecture adjusts weighted values (e.g., hyperparameters) of the neural network architecture until the outputted training feature vectors converge with predetermined expected feature vectors. When the training phase concludes, the analytics server 102 stores the weighted values and neural network architecture into the non-transitory storage media (e.g., memory, disk) of the analytics server 102. During the enrollment and/or the deployment phases, the analytics server 102 disables one or more layers of the neural network architecture (e.g., fully-connected layers, classification layer) to keep the weighted values fixed.

During the enrollment operational phase, an enrollee, such as an end-consumer of the call center system 110, provides several speech examples to the call analytics system 101. For example, the enrollee could respond to various interactive voice response (IVR) prompts of IVR software executed by a call center server 111. The call center server 111 then forwards the recorded responses containing bona fide enrollment audio signals to the analytics server 102. The analytics server 102 applies the trained neural network architecture to each of the enrollee audio samples and generates corresponding enrollee feature vectors (sometimes called "enrollee embeddings"), though the analytics server 102 disables certain layers, such as layers employed for training the neural network architecture. The analytics server 102 generates an average or otherwise algorithmically combines the enrollee feature vectors and stores the enrollee feature vectors into the analytics database 104 or the call center database 112.

Layers of the neural network architecture are trained to operate as one or more embedding extractors that generate the feature vectors representing certain types of embeddings. The embedding extractors generate the enrollee embeddings during the enrollment phase, and generate inbound embeddings (sometimes called "test embeddings") during the deployment phase. The embeddings include a spoof detection embedding (spoofprint) and a speaker recognition embedding (voiceprint). As an example, the neural network architecture generates an enrollee spoofprint and an enrollee voiceprint during the enrollment phase, and generates an inbound spoofprint and an inbound voiceprint during the deployment phase. Different embedding extractors of the neural network architecture generate the spoofprints and the voiceprints, though the same embedding extractor of the neural network architecture may be used to generate the spoofprints and the voiceprints in some embodiments.

As an example, the spoofprint embedding extractor may be a neural network architecture (e.g., ResNet, SyncNet) that processes a first set of features extracted from the input audio signals, where the spoofprint extractor comprises any number of convolutional layers, statistics layers, and fully-connected layers and trained according to the LMCL. The voiceprint embedding extractor may be another neural network architecture (e.g. (e.g., ResNet, SyncNet) that processes a second set of features extracted from the input audio signals, where the voiceprint embedding extractor comprises any number of convolutional layers, statistics layers, and fully-connected layers and trained according to a softmax function.

As a part of the loss function operations, the neural network performs a Linear Discriminant Analysis (LDA) algorithm or similar operation to transform the extracted embeddings to a lower-dimensional and more discriminative subspace. The LDA minimizes the intra-class variance and maximizes the inter-class variance between genuine training audio signals and spoof training audio signals. In some implementations, the neural network architecture may further include an embedding combination layer that performs various operations to algorithmically combine the spoofprint and the voiceprint into a combined embedding (e.g., enrollee combined embedding, inbound combined embedding). The embeddings, however, need not be combined in all embodiments. The loss function operations and LDA, as well as other aspects of the neural network architecture (e.g., scoring layers) are likewise configured to evaluate the combined embeddings, in addition or as an alternative to evaluating separate spoofprint and voiceprints embeddings.

The analytics server 102 executes certain data augmentation operations on the training audio signals and, in some implementations, on the enrollee audio signals. The analytics server 102 may perform different, or otherwise vary, the augmentation operations performed during the training phase and the enrollment phase. Additionally or alternatively, the analytics server 102 may perform different, or otherwise vary, the augmentation operations performed for training the spoofprint embedding extractor and the voiceprint embedding extractor. For example, the server may perform frequency masking (sometimes call frequency augmentation) on the training audio signals for the spoofprint embedding extractor during the training and/or enrollment phase. The server may perform noise augmentation for the voiceprint embedding extractor during the training and/or enrollment phase.

During the deployment phase, the analytics server 102 receives the inbound audio signal of the inbound phone call, as originated from the caller device 114 of an inbound caller. The analytics server 102 applies the neural network on the inbound audio signal to extract the features from the inbound audio and determine whether the caller is an enrollee who is enrolled with the call center system 110 or the analytics system 101. The analytics server 102 applies each of the layers of the neural network, including any in-network augmentation layers, but disables the classification layer. The neural network generates the inbound embeddings (e.g., spoofprint, voiceprint, combined embedding) for the caller and then determines one or more similarity scores indicating the distances between these feature vectors and the corresponding enrollee feature vectors. If, for example, the similarity score for the spoofprints satisfies a predetermined spoofprint threshold, then the analytics server 102 determines that the inbound phone call is likely spoofed or otherwise fraudulent. As another example, if the similarity score for the voiceprints or the combined embeddings satisfies a corresponding predetermined threshold, then the analytics server 102 determines that the caller and the enrollee are likely the same person or that the inbound call is genuine or spoofed (e.g., synthetic speech).

Following the deployment phase, the analytics server 102 (or another device of the system 100) may execute any number of various downstream operations (e.g., speaker authentication, speaker diarization) that employ the determinations produced by the neural network at deployment time.

The analytics database 104 and/or the call center database 112 may contain any number of corpora of training audio signals that are accessible to the analytics server 102 via one or more networks. In some embodiments, the analytics server 102 employs supervised training to train the neural network, where the analytics database 104 includes labels associated with the training audio signals that indicate which signals contain speech portions. The analytics server 102 may also query an external database (not shown) to access a third-party corpus of training audio signals. An administrator may configure the analytics server 102 to select the speech segments to have durations that are random, random within configured limits, or predetermined at the admin device 103. The duration of the speech segments vary based upon the needs of the downstream operations and/or based upon the operational phase. For example, during training or enrollment, the analytics server 102 will likely have access to longer speech samples compared to the speech samples available during deployment. As another example, the analytics server 102 will likely have access to longer speech samples during telephony operations compared to speech samples received for voice authentication.

The call center server 111 of a call center system 110 executes software processes for managing a call queue and/or routing calls made to the call center system 110, which may include routing calls to the appropriate call center agent devices 116 based on the inbound caller's comments, instructions, IVR inputs, or other inputs submitted during the inbound call. The call center server 111 can capture, query, or generate various types of information about the call, the caller, and/or the caller device 114 and forward the information to the agent device 116, where a graphical user interface (GUI) of the agent device 116 displays the information to the call center agent. The call center server 111 also transmits the information about the inbound call to the call analytics system 101 to preform various analytics processes on the inbound audio signal and any other audio data. The call center server 111 may transmit the information and the audio data based upon a preconfigured triggering conditions (e.g., receiving the inbound phone call), instructions or queries received from another device of the system 100 (e.g., agent device 116, admin device 103, analytics server 102), or as part of a batch transmitted at a regular interval or predetermined time.

The admin device 103 of the call analytics system 101 is a computing device allowing personnel of the call analytics system 101 to perform various administrative tasks or user-prompted analytics operations. The admin device 103 may be any computing device comprising a processor and software, and capable of performing the various tasks and processes described herein. Non-limiting examples of the admin device 103 may include a server, personal computer, laptop computer, tablet computer, or the like. In operation, the user employs the admin device 103 to configure the operations of the various components of the call analytics system 101 or call center system 110 and to issue queries and instructions to such components.

The agent device 116 of the call center system 110 may allow agents or other users of the call center system 110 to configure operations of devices of the call center system 110. For calls made to the call center system 110, the agent device 116 receives and displays some or all of the relevant information associated with the call routed from the call center server 111.

Example Operations

Figure 2:
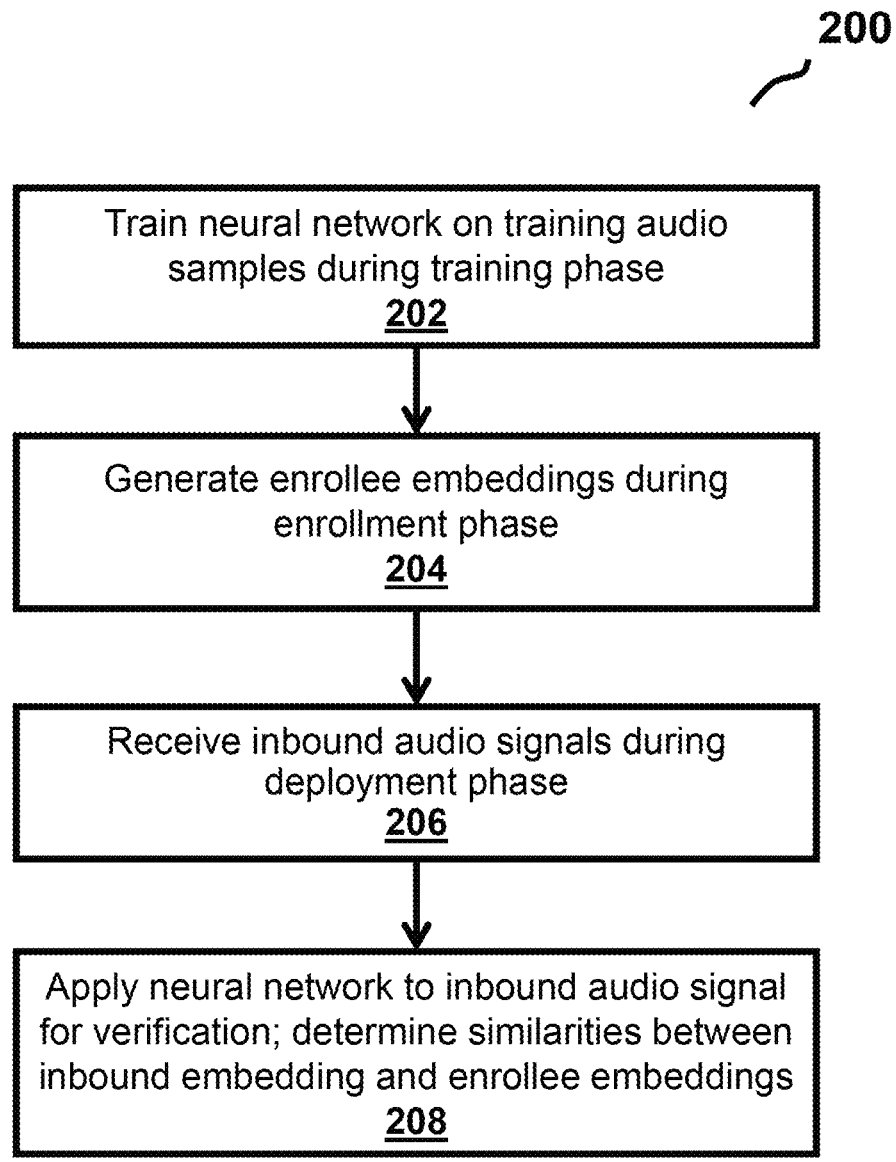
FIG. 2 shows steps of a method for implementing one or more neural networks architectures for spoof detection and speaker recognition, according to an embodiment.

FIG. 2 shows steps of a method 200 for implementing one or more neural networks architectures for spoof detection and speaker recognition, according to an embodiment. Embodiments may include additional, fewer, or different operations than those described in the method 200. The method 200 is performed by a server executing machine-readable software code of the neural network architectures, though it should be appreciated that the various operations may be performed by one or more computing devices and/or processors. Though the server is described as generating and evaluating spoofprint and voiceprint embeddings, the server need not generate and evaluate the voiceprint embedding in all embodiments to detect spoofing.

The server or layers of the neural network architecture may perform various pre-processing operations on an input audio signal (e.g., training audio signal, enrollment audio signal, inbound audio signal). These pre-processing operations may include, for example, extracting low-level features from the audio signals and transforming these features from a time-domain representation into a frequency-domain representation by performing Short-time Fourier Transforms (SFT) and/or Fast Fourier Transforms (FFT). The pre-processing operations may also include parsing the audio signals into frames or sub-frames, and performing various normalization or scaling operations. Optionally, the server performs any number of pre-processing operations before feeding the audio data into the neural network. The server may perform the various pre-processing operations in one or more of the operational phases, though the particular pre-processing operations performed may vary across the operational phases. The server may perform the various pre-processing operations separately from the neural network architecture or as in-network layer of the neural network architecture.

The server or layers of the neural network architecture may perform various augmentation operations on the input audio signal (e.g., training audio signal, enrollment audio signal). The augmentation operations generate various types of distortion or degradation for the input audio signal, such that the resulting audio signals are ingested by, for example, the convolutional operations that generate the feature vectors. The server may perform the various augmentation operations as separate operations from the neural network architecture or as in-network augmentation layers. The server may perform the various augmentation operations in one or more of the operational phases, though the particular augmentation operations performed may vary across the operational phases.

In step 202, a server places the neural network into a training operational phase. The server applies the neural network to thousands of speech samples (received as inputted audio signals) to train a classifier layer to identify, for example, speech portions of audio. The server may select training audio signals and/or randomly generate simulated audio segments, which the fully connected layer or classification layer uses to determine the level of error of training feature vectors (sometimes referred to as "training embeddings") produced by an embedding extractor of the neural network. The classifier layer adjusts the hyper-parameters of the neural network until the training feature vectors converge with expected feature vectors. When training is completed, the server stores the hyper-parameters into memory of the server or other memory location. The server may also disable one or more layers of the neural network in order to keep the hyper-parameters fixed.

In step 204, the server places the neural network into an enrollment operational phase to generate enrollee embeddings for an enrollee. The server receives enrollment speech samples for the enrollee and applies the neural network to generate enrollment feature vectors, including, for example, an enrollee spoofprint and an enrollee voiceprint. The server may enable and/or disable certain layers of the neural network architecture during the enrollment phase. For instance, the server typically enables and applies each of the layers during the enrollment phase, though the server disables the classification layer.

When extracting a particular embedding (e.g., spoofprint, voiceprint) for the enrollee, the neural network architecture generates a set of enrollee feature vectors based on features related to the particular type of embedding as extracted from each enrollee audio signal. The neural network architecture then extracts the particular embedding by combining this set of enrollee feature vectors based on an average of the enrollee feature vectors or any other algorithmic technique for combining the enrollee feature vectors. The server stores each enrollee embedding into a non-transitory storage medium.

In step 206, the server places the neural network architecture into a deployment phase to generate inbound embeddings for an inbound speaker and detect spoofing and verify the speaker. The server may enable and/or disable certain layers of the neural network architecture during the deployment phase. For instance, the server typically enables and applies each of the layers during the deployment phase, though the server disables the classification layer. The server receives the inbound audio signal for the inbound speaker and feeds the inbound audio signal into the neural network architecture.

In step 208, during the deployment operational phase, the server receives the inbound audio signal for the speaker and applies the neural network to extract the inbound embeddings, including, for example, an inbound spoofprint and an inbound voiceprint. The neural network architecture then generates one or more similarity scores based on the similarities or differences between the inbound embeddings and the enrolled embeddings. For example, the neural network architecture extracts the inbound spoofprint and outputs a similarity score indicating the distance (e.g., similarities, differences) between the inbound spoofprint and the enrollee spoofprint. A larger distance may indicate a lower likelihood that the inbound audio signal is a spoof, due to lower/fewer similarities between the inbound spoofprint and the enrollee spoofprint. In this example, the server determines the speaker of the inbound audio signal is spoofing the enrollee when the similarity score satisfies a spoof threshold value.

As another example, the neural network architecture extracts the inbound voiceprint and outputs a similarity score indicating the distance between the inbound voiceprint and the enrollee voiceprint. A larger distance may indicate a lower likelihood that the speaker of the inbound audio signal matches to the enrollee. In this example, the server identifies a match (or a likely match) between the speaker and the enrollee when the similarity score satisfies a voice match threshold value.

The server may evaluate the spoofprints and voiceprints simultaneously or sequentially. For example, the server may evaluate the inbound voiceprint against the enrollee voiceprint. If the server determines that the speaker of the inbound audio signal likely matches the enrollee, then the server evaluates the inbound spoofprint against the enrollee spoofprint. The server then determines whether the inbound audio signal is a spoofing attempt. As another example, the server evaluates the spoofprints and voiceprints without regard to the sequencing, yet require the extracted inbound embeddings to satisfy corresponding thresholds. In some implementations, the server generates a combined similarity score using a voice similarity score (based on comparing the voiceprints) and a spoof likelihood or detection score (based on comparing the spoofprints). The server generates the combined similarity score by summing or otherwise algorithmically combining the voice similarity score and the spoof likelihood score. The server then determines whether the combined similarity score satisfies an authentication or verification threshold score.

Following successful or failed verification of the speaker of the inbound audio signal, in step 208, the server may use the determination for one or more downstream operations (e.g., speaker authentication, speaker diarization). The server may, for example, use the spoof or match determinations, the similarity scores, and/or the inbound embeddings to perform the given downstream functions.

Training Operational Phases

Figure 3:
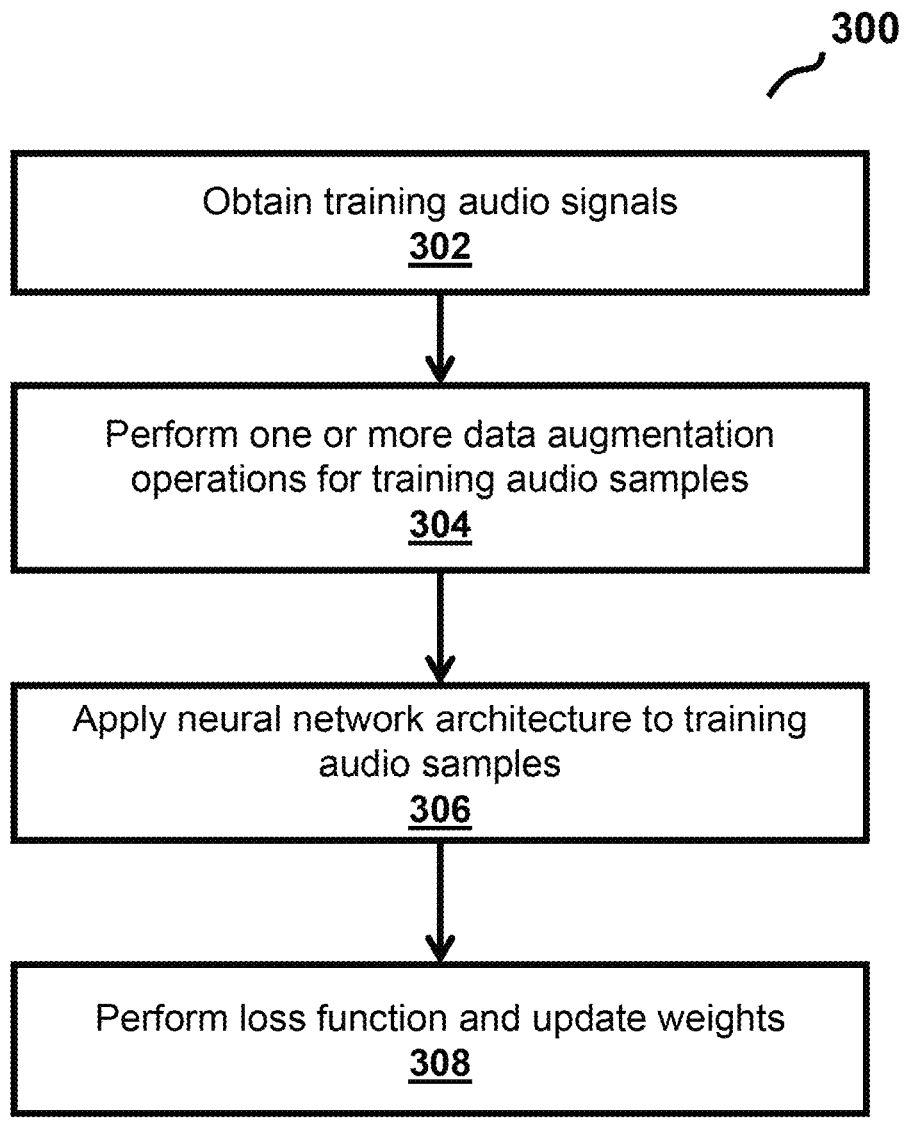
FIG. 3 shows steps of a method for training operations of one or more neural networks architectures for spoof detection and speaker recognition, according to an embodiment.

FIG. 3 shows steps of a method 300 for training operations of one or more neural networks architectures for spoof detection and speaker recognition, according to an embodiment. Embodiments may include additional, fewer, or different operations than those described in the method 300. The method 300 is performed by a server executing machine-readable software code of the neural network architectures, though it should be appreciated that the various operations may be performed by one or more computing devices and/or processors.

The server or layers of the neural network architecture may perform various pre-processing operations on an input audio signal (e.g., training audio signal, enrollment audio signal, inbound audio signal). These pre-processing operations may include, for example, extracting low-level features from the audio signals and transforming these features from a time-domain representation into a frequency-domain representation by performing Short-time Fourier Transforms (SFT) and/or Fast Fourier Transforms (FFT). The pre-processing operations may also include parsing the audio signals into frames or sub-frames, and performing various normalization or scaling operations. Optionally, the server performs any number of pre-processing operations before feeding the audio data into the neural network. The server may perform the various pre-processing operations in one or more of the operational phases, though the particular pre-processing operations performed may vary across the operational phases. The server may perform the various pre-processing operations separately from the neural network architecture or as in-network layer of the neural network architecture.

The server or layers of the neural network architecture may perform various augmentation operations on the input audio signal (e.g., training audio signal, enrollment audio signal). The augmentation operations generate various types of distortion or degradation for the input audio signal, such that the resulting audio signals are ingested by, for example, the convolutional operations that generate the feature vectors. The server may perform the various augmentation operations as separate operations from the neural network architecture or as in-network augmentation layers. The server may perform the various augmentation operations in one or more of the operational phases, though the particular augmentation operations performed may vary across the operational phases.

During a training phase, the server applies a neural network architecture to training audio signals (e.g., clean audio signals, simulated audio signals, previously received observed audio signals). In some instances, before applying the neural network architecture to the training audio signals, the server pre-processes the training audio signals according to various pre-processing operations described herein, such that the neural network architecture receives arrays representing portions of the training audio signals.

In step 302, the server obtains the training audio signals, including clean audio signals and noise samples. The server may receive or request clean audio signals from one or more speech corpora databases. The clean audio signals may include speech originating from any number speakers, where the quality allows the server identify the speech—i.e., the clean audio signal contains little or no degradation (e.g., additive noise, multiplicative noise). The clean audio signals may be stored in non-transitory storage media accessible to the server or received via a network or other data source. In some circumstances, the server generates a simulated clean audio signal using simulated audio signals. For example, the server may generate a simulated clean audio signal by simulating speech.

In step 304, the server performs one or more data augmentation operations using the clean training audio samples and/or to generate simulated audio samples. For instance, the server generates one or more simulated audio signals by applying augmentation operations for degrading the clean audio signals. The server may, for example, generate simulated audio signals by applying additive noise and/or multiplicative noise on the clean audio signals and labeling these simulated audio signals. The additive noise may be generated as simulated white Gaussian noise or other simulated noises with different spectral shapes, and/or example sources of backgrounds noise (e.g., real babble noise, real white noise, and other ambient noise) on the clean audio signals. The multiplicative noise may be simulated acoustic impulse responses. The server may perform additional or alternative augmentation operations on the clean audio signals to produce simulated audio signals, thereby generating a larger set of training audio signals.

In step 306, the server uses the training audio signals to train one or more neural network architectures. As discussed herein, the result of training the neural network architecture is to minimize the amount of error between a predicted output (e.g., neural network architecture outputted of genuine or spoofed; extracted features; extracted feature vector) and an expected output (e.g., label associated with the training audio signal indicating whether the particular training signal is genuine or spoofed; label indicating expected features or feature vector of the particular training signal). The server feeds each training audio signal to the neural network architecture, which the neural network architecture uses to generate the predicted output by applying the current state of the neural network architecture to the training audio signal.

In step 308, the server performs a loss function (e.g., LMCL, LDA) and updates hyper-parameters (or other types of weight values) of the neural network architecture. The server determines the error between the predicted output and the expected output by comparing the similarity or difference between the predicted output and expected output. The server adjusts the algorithmic weights in the neural network architecture until the error between the predicted output and expected output is small enough such that the error is within a predetermined threshold margin of error and stores the trained neural network architecture into memory.

Enrollment and Deployment Operational Phases

Figure 4:
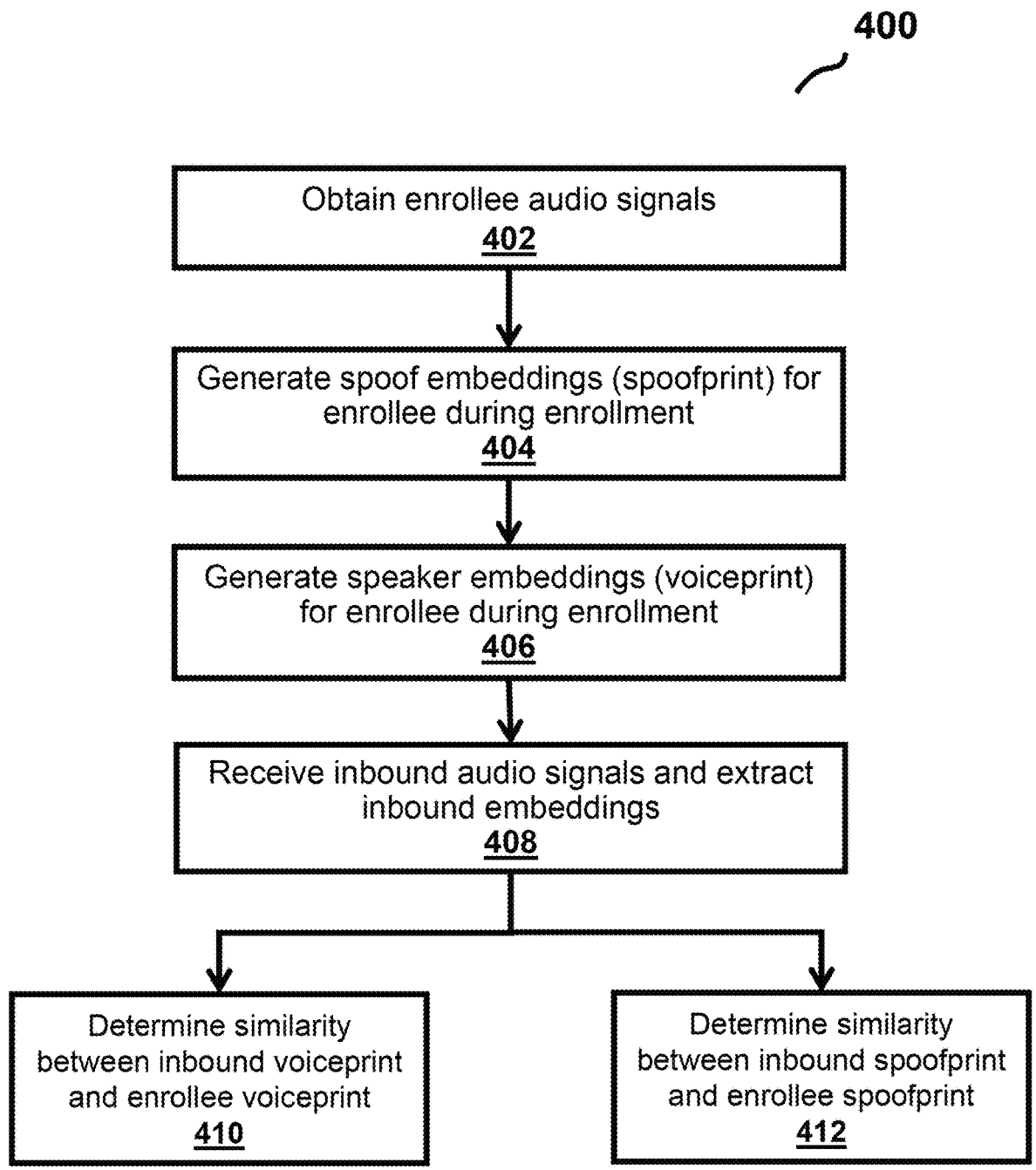
FIG. 4 shows steps of a method for enrollment and deployment operations of one or more neural networks architectures for spoof detection and speaker recognition, according to an embodiment.

FIG. 4 shows steps of a method 400 for enrollment and deployment operations of one or more neural networks architectures for spoof detection and speaker recognition, according to an embodiment. Embodiments may include additional, fewer, or different operations than those described in the method 400. The method 400 is performed by a server executing machine-readable software code of the neural network architectures, though it should be appreciated that the various operations may be performed by one or more computing devices and/or processors.

During an enrollment phase, the server applies a neural network architecture to bona fide enrollee audio signals. In some instances, before applying the neural network architecture to the enrollee audio signals, the server pre-processes the enrollee audio signals according to various pre-processing operations described herein, such that the neural network architecture receives arrays representing portions of the enrollee audio signals. In operation, embedding extractor layers of the neural network architecture generate feature vectors based on features of the enrollee audio signals and extract enrollee embeddings, which the server later references during a deployment phase. In some embodiments, the same embedding extractor of the neural network architecture is applied for each type embedding, and in some embodiments different embedding extractors of the neural network architecture are applied for corresponding types of embeddings.

In step 402, the server obtains the enrollee audio signals for the enrollee. The server may receive the enrollee audio signals directly from a device (e.g., telephone, IoT device) of the enrollee, a database, or a device of a third-party (e.g., customer call center system). In some implementations, the server may perform one or more data augmentation operations on the enrollee audio signals, which could include the same or different augmentation operations performed during a training phase. In some cases, the server extracts certain features from the enrollee audio signals. The server extracts the features based on the relevant types of enrollee embeddings. For instance, the types of features used to produce a spoofprint can be different from the types of features used to produce a voiceprint.

In step 404, the server applies the neural network architecture to each enrollee audio signal to extract the enrollee spoofprint. The neural network architecture generates spoofprint feature vectors for the enrollee audio signals using the relevant set of extracted features. The neural network architecture extracts the spoofprint embedding for the enrollee by combining the spoofprint feature vectors according to various statistical and/or convolutional operations. The server then stores the enrollee spoofprint embedding into non-transitory storage media.

In step 406, the server applies the neural network architecture to each enrollee audio signal to extract the enrollee voiceprint. The neural network architecture generates voiceprint feature vectors for the enrollee audio signals using the relevant set of extracted features, which may be the same or different types of features used to extract the spoofprint. The neural network architecture extracts the voiceprint embedding for the enrollee by combining the voiceprint feature vectors according to various statistical and/or convolutional operations. The server then stores the enrollee voiceprint embedding into non-transitory storage media.

In step 408, the server receives an inbound audio signal involving a speaker and extracts inbound embeddings for the speaker corresponding to enrollee embeddings. The inbound audio signal may be received directly from a device of the speaker or a device of the third-party. The server applies the neural network architecture to the inbound audio signal to extract, for example, an inbound spoofprint and an inbound voiceprint.

In step 410, the server determines a similarity score based upon a distance between the inbound voiceprint and the enrollee voiceprint. The server then determines whether the similarity score satisfies a voice match threshold. In step 412, the server determines a similarity score based upon the distance between the inbound voiceprint and the enrollee voiceprint. The server then determines whether the similarity score satisfies a spoof detection threshold. In some embodiments, the server performs steps 410 and 412 sequentially, whereby the server performs spoof detection (in step 412) in response to the server determining that the inbound voiceprint satisfies the voice match threshold (in step 410). In some embodiments, the server performs steps 410 and 412 without respect to sequence, whereby the server determines whether the inbound voiceprint satisfies the voice match threshold (in step 410) and whether the inbound spoofprint satisfies the spoof detection threshold (in step 412) regardless of the outcome of the counterpart evaluation.

Figure 5:
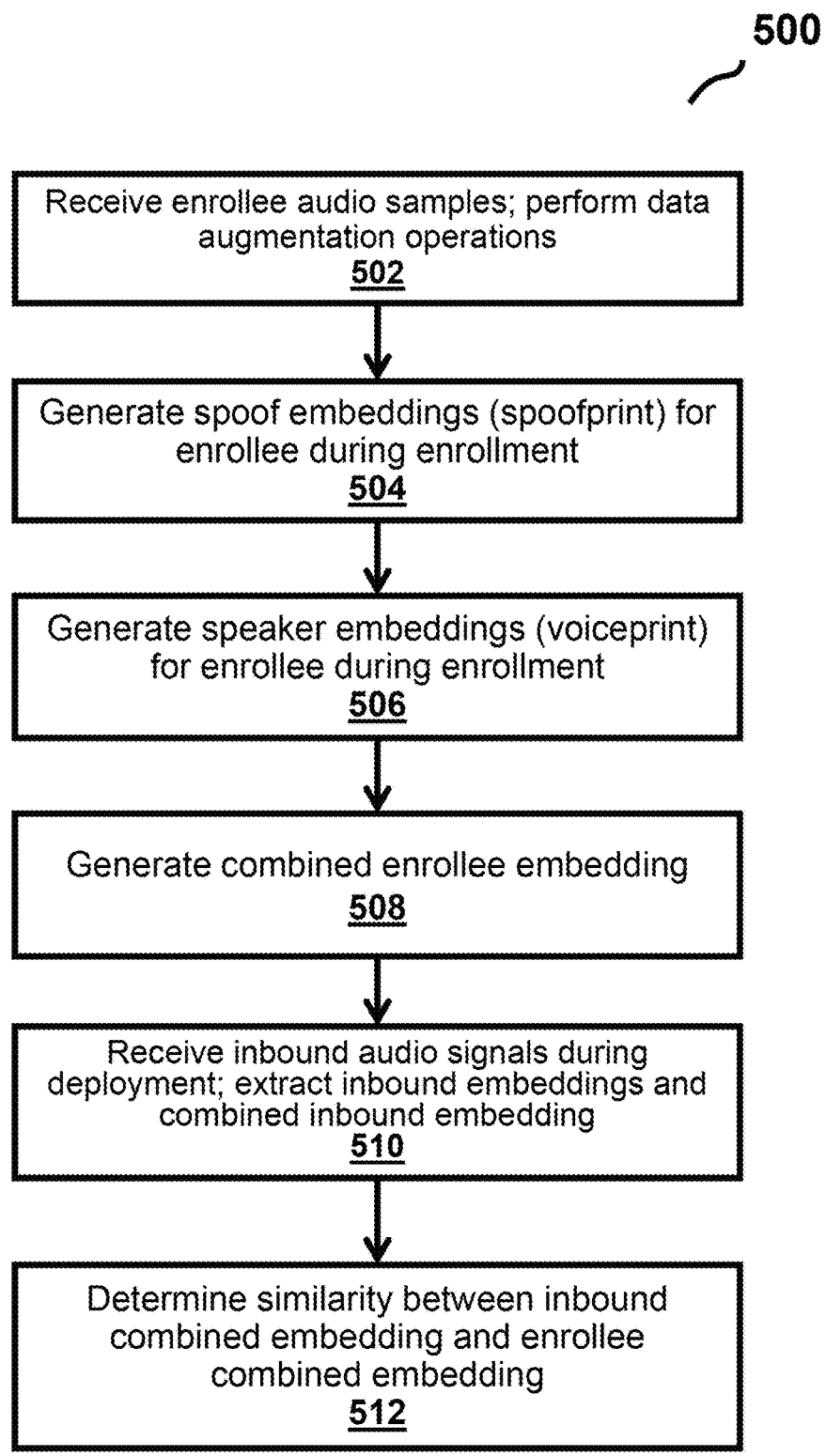
FIG. 5 shows steps of a method for enrollment and deployment operations of one or more neural networks architectures for spoof detection and speaker recognition, according to an embodiment.

FIG. 5 shows steps of a method 500 for enrollment and deployment operations of one or more neural networks architectures for spoof detection and speaker recognition, according to an embodiment. Embodiments may include additional, fewer, or different operations than those described in the method 500. The method 500 is performed by a server executing machine-readable software code of the neural network architectures, though it should be appreciated that the various operations may be performed by one or more computing devices and/or processors.

During an enrollment phase, the server applies a neural network architecture to bona fide enrollee audio signals. In some instances, before applying the neural network architecture to the enrollee audio signals, the server pre-processes the enrollee audio signals according to various pre-processing operations described herein, such that the neural network architecture receives arrays representing portions of the enrollee audio signals. In operation, embedding extractor layers of the neural network architecture generate feature vectors based on features of the enrollee audio signals and extract enrollee embeddings, which the server later references during a deployment phase. In some embodiments, the same embedding extractor of the neural network architecture is applied for each type embedding, and in some embodiments different embedding extractors of the neural network architecture are applied for corresponding types of embeddings.

In step 502, the server obtains the enrollee audio signals for the enrollee. The server may receive the enrollee audio signals directly from a device (e.g., telephone, IoT device) of the enrollee, a database, or a device of a third-party (e.g., customer call center system). In some implementations, the server may perform one or more data augmentation operations on the enrollee audio signals, which could include the same or different augmentation operations performed during a training phase. In some cases, the server extracts certain features from the enrollee audio signals. The server extracts the features based on the relevant types of enrollee embeddings. For instance, the types of features used to produce a spoofprint can be different from the types of features used to produce a voiceprint.

In step 504, the server applies the neural network architecture to each enrollee audio signal to extract the enrollee spoofprint. The neural network architecture generates spoofprint feature vectors for the enrollee audio signals using the relevant set of extracted features. The neural network architecture extracts the spoofprint embedding for the enrollee by combining the spoofprint feature vectors according to various statistical and/or convolutional operations. The server then stores the enrollee spoofprint embedding into non-transitory storage media.

In step 506, the server applies the neural network architecture to each enrollee audio signal to extract the enrollee voiceprint. The neural network architecture generates voiceprint feature vectors for the enrollee audio signals using the relevant set of extracted features, which may be the same or different types of features used to extract the spoofprint. The neural network architecture extracts the voiceprint embedding for the enrollee by combining the voiceprint feature vectors according to various statistical and/or convolutional operations. The server then stores the enrollee voiceprint embedding into non-transitory storage media.

In step 508, the server generates an enrollee combined embedding for the enrollee. The neural network architecture includes one or more layers for algorithmically combining the enrollee spoofprint embedding and the enrollee voiceprint embedding. The server then stores the enrollee combined embedding into non-transitory storage media.

In step 510, the server receives an inbound audio signal involving a speaker and extracts inbound embeddings for the speaker corresponding to the extracted enrollee embeddings, including an inbound spoofprint embedding, an inbound voiceprint embedding, and an inbound combined embedding. The inbound audio signal may be received directly from a device of the speaker or a device of the third-party. The server applies the neural network architecture to the inbound audio signal to extract the inbound spoofprint and the inbound voiceprint, and generate the inbound combined embedding by algorithmically combining the inbound spoofprint and the inbound voiceprint.

In step 512, the server determines a similarity score based upon a distance between the inbound combined embedding and the enrollee combined embedding. The server then determines whether the similarity score satisfies a verification threshold. The server verifies the inbound audio signal as matching the enrollee voice with the speaker and as genuine (not spoofed) when the server determines the inbound combined embedding satisfies the corresponding verification threshold score. In some configurations, the call is allowed to proceed upon the verification by the server.

Example Neural Network Architecture

Example of Training Phase

Figure 6:
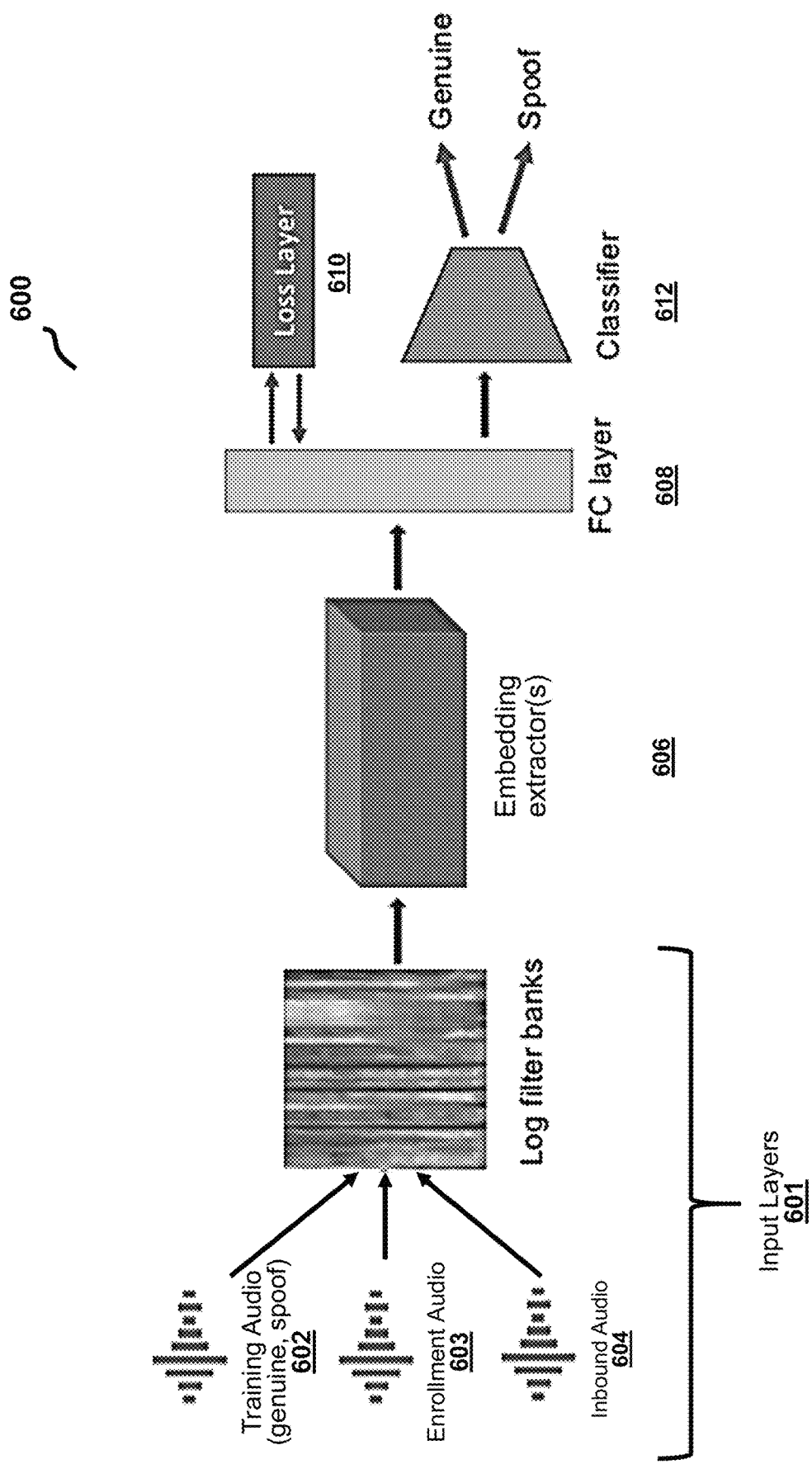
FIG. 6 shows architecture components of a neural network architecture for processing audio signals to detect spoofing attempts, according to an embodiment.

FIG. 6 shows architecture components of a neural network architecture 600 for processing audio signals to detect spoofing attempts, according to an embodiment. The neural network 600 is executed by a server during a training operational phase and optional enrollment and deployment operational phases, though the neural network 600 may be executed by any computing device comprising a processor capable of performing the operations of the neural network 600 and by any number of such computing devices. The neural network 600 includes input layers 601 for ingesting audio signals enrollment audio signals 602, 603 (e.g., training audio signals 602, enrollment audio signals 603) and performing various augmentation operations; layers that define one or more embedding extractors 606 for generating one or more feature vectors (or embeddings) and performing other operations; one or more fully-connected layers 608 performing various statistical and algorithmic combination operations; a loss layer 610 for performing one or more loss functions; and a classifier 612 for performing any number of scoring and classification operations based upon the embeddings. It should be appreciated that the neural network architecture 600 need not perform operations of an enrollment operational phase. As such, in some embodiments, the neural network architecture 600 includes the training and deployment operational phases In the training phase, the server feeds the training audio signals 602 into the input layers 601, where the training audio signals may include any number of genuine and spoofed or false audio signals. The training audio signals 602 may be raw audio files or pre-processed according to one or more pre-processing operations. The input layers 601 may perform one or more pre-processing operations on the training audio signals 602. The input layers 601 extract certain features from the training audio signals 602 and perform various data augmentation operations on the training audio signals 602. For instance, input layers 601 may convert the training audio signals 602 into multi-dimensional log filter banks (LFBs). The input layers 601 then perform, for example, a frequency masking data augmentation operation on one or more portions of the LFB representations of the training audio signals 602, thereby negating or nullifying how such portions would factor into later operations. The training audio signals 602 are then fed into functional layers (e.g., ResNet blocks) defining the embedding extractors 606. The embedding extractors 606 generate feature vectors based on the extracted features fed into the embedding extractors 606 and extract, for example, a spoof embedding, among other types of embeddings (e.g., voiceprint embeddings), based upon the feature vectors.

The spoof embedding extractor 606 is trained by performing a loss layer 610 for learning and tuning spoof embedding according to labels associated with the training audio signals 602. The classifier 612 uses the spoof embeddings to determine whether the given input layers 601 is "genuine" or "spoofed." The loss layer 610 tunes the embedding extractor 606 by performing the loss function (e.g., LMCL) to determine the distance (e.g., large margin cosine loss) between the determined genuine and spoof classifications, as indicated by supervised labels or previously generated clusters. A user may tune parameters of the loss layer 610 (e.g., adjust the m value of the LMCL function) to tune the sensitivity of the loss function. The server feeds the training audio signals 602 into the neural network architecture 600 to re-train and further tune the layers of the neural network 600. The server fixes the hyper-parameters of the embedding extractor 606 and/or fully-connected layers 608 when predicted outputs (e.g., classifications, feature vectors, embeddings) converge with the expected outputs within a threshold margin of error.

In some embodiments, the server may forgo the enrollment phase and proceed directly to the deployment phase. The server feeds inbound audio signals (which could include an enrollment audio signal) into the neural network architecture 600. The classifier 612 includes one or more layers trained to determine the whether the outputs (e.g., classifications, feature vectors, embeddings) of the embedding extractor 606 and/or fully-connected layers 608 are within a given distance from a threshold value established during the training phase according to the LMCL and/or LDA algorithms. By executing the classifier 612, the server classifies an inbound audio signal as genuine or spoofed based on the neural network architecture's 600 output(s). In some cases, the server may authenticate the inbound audio signal according to the results of the classifier's 612 determination.

During the optional enrollment phase, the server feeds one or more enrollment audio signals 603 into the embedding extractor 606 to extract an enrollee spoofprint embedding for an enrollee. The enrollee spoofprint embedding is then stored into memory. In some embodiments, the enrollee spoofprint embeddings are used to train a classifier 612 for the enrollee, though the server may disable the classifier 612 during the enrollment phase in some embodiments.

Example Enrollment and Deployment

Figure 7:
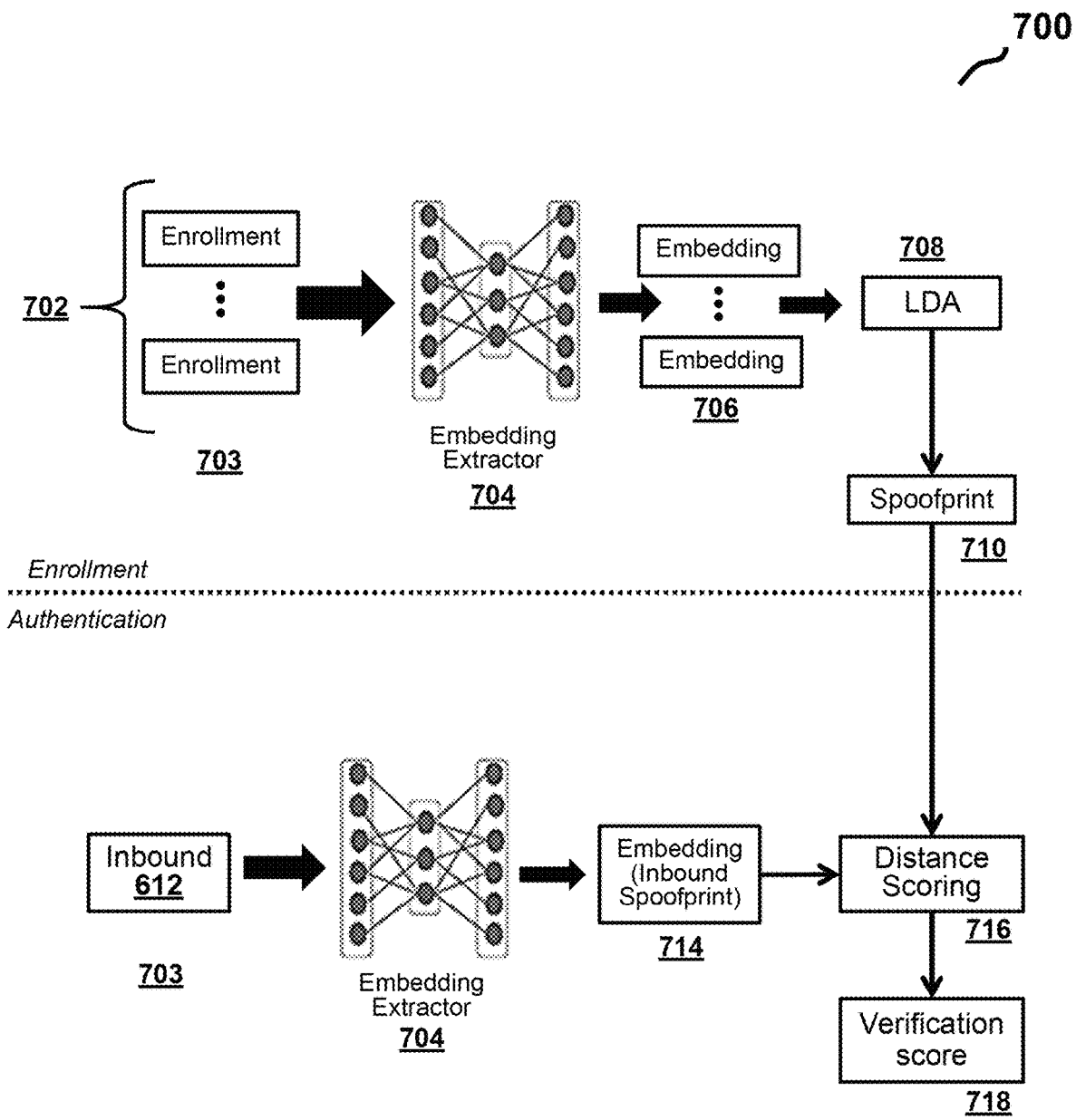
FIG. 7 shows architecture components of a neural network architecture for processing audio signals to detect spoofing attempts, according to an embodiment.

FIG. 7 shows architecture components of a neural network architecture 700 for processing audio signals 702, 712 to detect spoofing attempts, according to an embodiment. The neural network 700 is described as being executed by a server during enrollment and deployment operational phases for authentication, though the neural network 700 may be executed by any computing device comprising a processor capable of performing the operations of the neural network 700 and by any number of such computing devices. The neural network 700 includes input layers 703 for ingesting audio signals 702, 712 and performing various augmentation operations; layers that define one or more embedding extractors 704 (e.g., spoofprint embedding extractor, voiceprint embedding extractor) for generating one or more embeddings 706, 714; one or more layers defining a combination operation (LDA) that algorithmically combines enrollee embeddings 706; and one or more scoring layers 716 that perform various scoring operations, such as a distance scoring operation 716, to produce a verification score 718.

The server feeds audio signals 702, 712 to the input layers 703 to begin applying the neural network 700. In some cases, the input layers 703 perform one or more pre-processing operations on the audio signals 702, 712, such as parsing the audio signals 702, 712 into frames or segments, extracting low-level features, and transforming the audio signals 702, 712 from a time-domain representation to a frequency-domain (or energy domain) representation, among other pre-processing operations.

During the enrollment phase, the input layers 703 receive enrollment audio signals 702 for an enrollee. In some implementations, the input layers 703 perform data augmentation operations on the enrollment audio signals 702 to, for example, manipulate the audio signals within the enrollment audio signals 702, manipulate the low-level features, or generate simulated enrollment audio signals 702 that have manipulated features or audio signal based on corresponding enrollment audio signals 702.

During the deployment phase, the input layers 703 may perform the pre-processing operations to prepare an inbound audio signal 712 for the embedding extractor 704. The server, however, may disable the augmentation operations of the input layers 703, such that the embedding extractor 704 evaluates the features of the inbound audio signal 712 as received.

The embedding extractor 704 comprises one or more layers of the neural network 700 trained (during a training phase) to detect speech and generate feature vectors based on the features extracted from the audio signals 702, 712, which the embedding extractor 704 outputs as embeddings 706, 714. During the enrollment phase, the embedding extractor 704 produces enrollee embeddings 706 for each of the enrollment audio signals 702. The neural network 700 then performs the combination operation 708 on the embeddings 706 to extract the enrollee spoofprint 710 for the enrollee.

During the deployment phase, the embedding extractor 704 generates the feature vector for the inbound audio signal 712 based on the features extracted from the inbound audio signal 712. The embedding extractor 704 outputs this feature vector as an inbound spoofprint 714 for the inbound audio signal 712.

The neural network 700 feeds the enrollee spoofprint 710 and the inbound spoofprint 714 to the scoring layers 716 to perform various scoring operations. The scoring layers 716 perform a distance scoring operation that determines the distance (e.g., similarities, differences) between the enrollee spoofprint 710 and the inbound spoofprint 714, indicating the likelihood that inbound spoofprint 714 is a spoofing attempt. For instance, a lower distance score for the inbound spoofprint 714 indicates the inbound spoofprint 714 is more likely to be a spoofing attempt. The neural network 700 may output a verification score 718, which may be a value generated by the scoring layers 716 based on one or more scoring operations (e.g., distance scoring).

In some implementations, the scoring layers 716 determine whether the distance score or other outputted values satisfy threshold values. In such implementations, the verification score 718 need not be a numeric output. For example, the verification score 718 may be a human-readable indicator (e.g., plain language, visual display) that indicates whether the neural network 700 has determined that the inbound audio signal 712 is a spoof attempt (e.g., the server has detected spoofing). Additionally or alternatively, the verification score 718 may include a machine-readable detection indicator or authentication instruction, which the server transmits via one or more networks to computing devices performing one or more downstream applications.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for spoofing countermeasures, the method comprising:
    obtaining, by a computer, a plurality of training audio signals, including one or more clean training signals having one or more speaker biometric features and one or more spoof training signals having one or more spoofing features;
    training, by the computer, a voiceprint embedding extractor for extracting a voiceprint based upon the one or more speaker biometric features, by applying the voiceprint embedding extractor on the one or more clean training signals having the one or more speaker biometric features;
    training, by the computer, a spoofprint embedding extractor for extracting a spoofprint distinct from the voiceprint based upon the one or more spoofing features, by applying the spoofprint embedding extractor on the one or more spoof training signals having the one or more spoofing features; and
    for an inbound audio signal at a deployment time, extracting, by the computer, an inbound spoofprint based upon the one or more spoofing features of the inbound audio signal by applying the spoofprint embedding extractor on the inbound audio signal.

2. The method according to claim 1, wherein the computer trains the spoofprint embedding extractor using at least one clean audio signal.

3. The method according to claim 1, wherein obtaining the plurality of training audio signals includes generating, by the computer, a spoof training signal as a simulated audio signal of a corresponding clean audio signal by executing one or more data augmentation operations on the corresponding clean audio signal.

4. The method according to claim 1, wherein training the spoofprint embedding extractor includes:
    applying, by the computer, the spoofprint embedding extractor on a spoof training signal to extract a training spoofprint based on the one or more spoofing features of the spoof training signal; and
    executing, by the computer, a loss function using the training spoofprint extracted by the spoofprint embedding extractor for the spoof training signal.

5. The method according to claim 1, further comprising updating, by the computer, one or more parameters of the spoofprint embedding extractor based upon a difference between the training spoofprint and an expected training spoofprint.

6. The method according to claim 1, further comprising training, by the computer, a classifier of a neural network architecture for speaker recognition by applying the neural network architecture on each training voiceprint.

7. The method according to claim 1, further comprising training, by the computer, a classifier of a neural network architecture for spoof detection by applying the neural network architecture on each training spoofprint.

8. The method according to claim 1, further comprising:
    obtaining, by the computer, a plurality of enrollment audio signals associated with an enrolled user, including one or more clean enrollment signals having the one or more speaker biometric features for the enrolled user and one or more enrollment spoof signals having the one or more spoofing features;
    applying, by the computer, the spoofprint embedding extractor on the one or more enrollment spoof signals to extract an enrolled spoofprint for the enrolled user based upon the one or more spoofing features of the one or more enrollment spoof signals.

9. The method according to claim 8, further comprising for the inbound audio signal at the deployment time, generating, by the computer, a spoof score for the inbound audio signal based upon a distance between the inbound spoofprint and the enrolled spoofprint.

10. The method according to claim 8, further comprising:
    applying, by the computer, the voiceprint embedding extractor on the one or more clean enrollment signals to extract an enrolled voiceprint for the enrolled user based upon the one or more speaker biometric features for the enrolled user of the one or more clean enrollment signals; and
    for the inbound audio signal at the deployment time, generating, by the computer, a speaker recognition score for the inbound audio signal based upon a second distance between an inbound voiceprint and the enrolled voiceprint.

11. A computer-implemented method for spoofing countermeasures, the method comprising:
   extracting, by a computer, an input voiceprint for an input audio signal based upon one or more speaker biometric features of the input audio signal by applying a voiceprint embedding extractor for extracting a voiceprint based upon the one or more speaker biometric features;
   extracting, by the computer, an input spoofprint for the input audio signal based upon one or more spoofing features of the input audio signal by applying a spoofprint embedding extractor for extracting a spoofprint distinct from the voiceprint based upon the one or more spoofing features;
   generating, by the computer, an input combined embedding based upon the input voiceprint and the input spoofprint; and
   generating, by the computer, a combined similarity score between the input combined embedding and a second combined embedding.

12. The method according to claim 11, further comprising identifying, by the computer, the input audio signal as being at least one of genuine or fraudulent based upon the combined similarity score and one or more corresponding preconfigured threshold scores.

13. The method according to claim 11, further comprising:
   extracting, by the computer, an enrolled voiceprint for an enrolled user based upon the one or more speaker biometric features in an enrollment audio signal;
   extracting, by the computer, an enrolled spoofprint for the enrolled user based upon the one or more spoofing features in at least one enrollment audio signal; and
   generating, by the computer, the second combined embedding as an combined enrollment embedding for the enrolled user based upon the enrolled voiceprint and the enrolled spoofprint.

14. The method according to claim 13, further comprising generating, by the computer, one or more simulated enrollment spoofing signals by executing one or more data augmentation operations on the enrollment audio signal.

15. The method according to claim 11, further comprising generating, by the computer, a spoofing score for the input audio signal based upon a distance between the input spoofprint and a second spoofprint used for the second combined embedding.

16. The method according to claim 11, further comprising generating, by the computer, a voice similarity score for the input audio signal based upon a distance between the input voiceprint and a second voiceprint used for the second combined embedding.

17. The method according to claim 11, further comprising executing, by the computer, a loss function using the combined similarity score as a distance loss between the input combined embedding as a predicted combined embedding and the second combined embedding as an expected combined embedding indicated by a training label associated with the input audio signal.

18. The method according to claim 17, further comprising training, by the computer, the voiceprint embedding extractor by applying the voiceprint embedding extractor on a training audio signal having the one or more speaker biometric features, wherein the loss function updates one or more parameters of the voiceprint embedding extractor based upon the distance loss.

19. The method according to claim 17, further comprising training, by the computer, the spoofprint embedding extractor by applying the spoofprint embedding extractor on at least one training audio signal having the one or more spoofing features, wherein the loss function updates one or more parameters of the spoofprint embedding extractor based upon the distance loss.

20. The method according to claim 17, further comprising generating, by the computer, one or more simulated spoofed training signals by executing one or more data augmentation operations on the training audio signal.

* * * * *